(12) United States Patent
Oriol et al.

(10) Patent No.: US 12,158,105 B2
(45) Date of Patent: Dec. 3, 2024

(54) ISOLATION OF A TURBINE ENGINE HEAT EXCHANGER IN THE EVENT OF A LEAK FROM AN ELECTRICAL AND MECHANICAL HYDRAULIC CONTROL VALVE

(71) Applicant: SAFRAN AIRCRAFT ENGINES, Paris (FR)

(72) Inventors: Sébastien Oriol, Moissy-Cramayel (FR); Mohammed-Lamine Boutaleb, Moissy-Cramayel (FR); Nicolas Vincent Pierre-Yves Cotereau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 137 days.

(21) Appl. No.: 17/904,249

(22) PCT Filed: Feb. 17, 2021

(86) PCT No.: PCT/FR2021/050271
§ 371 (c)(1),
(2) Date: Aug. 15, 2022

(87) PCT Pub. No.: WO2021/165611
PCT Pub. Date: Aug. 26, 2021

(65) Prior Publication Data
US 2023/0116598 A1 Apr. 13, 2023

(30) Foreign Application Priority Data
Feb. 21, 2020 (FR) ........................................ 2001739

(51) Int. Cl.
*F02C 7/14* (2006.01)
*F01D 25/18* (2006.01)
(Continued)

(52) U.S. Cl.
CPC ................ *F02C 7/14* (2013.01); *F01D 25/18* (2013.01); *F01M 1/22* (2013.01); *F02C 7/224* (2013.01);
(Continued)

(58) Field of Classification Search
CPC ........ F16H 57/0435; F02C 7/14; F02C 7/224; F01D 25/18; F01M 1/22; F16K 17/04
See application file for complete search history.

(56) References Cited

U.S. PATENT DOCUMENTS 5,749,439 A * 5/1998 Van Maanen ....... F16H 57/0412
184/104.1
7,131,612 B2 * 11/2006 Baptist .................. B64D 15/06
244/134 B
(Continued)

FOREIGN PATENT DOCUMENTS

FR 3001253 A1 7/2014
FR 3027624 A1 4/2016
(Continued)

OTHER PUBLICATIONS

International Search Report for issued in Application No. PCT/FR2021/050271 dated May 6, 2021.
Written Opinion for PCT/FR2021/050271 dated May 6, 2021.
Search Report issued in French Patent Application No. 2001739 dated Oct. 26, 2020.

*Primary Examiner* — Jessica Cahill
(74) *Attorney, Agent, or Firm* — Pearne & Gordon LLP

(57) ABSTRACT

An assembly for a fluid circuit of a turbine engineincludes a main branch, a fluid control valve, and a bypass branch which is arranged in parallel to the main branch. The fluid control valve includes a main outlet which is fluidly connected to the main branch and a bypass outlet which is fluidly connected to the bypass branch. The fluid control valve including a shutter, a spring for biasing the shutter, and control members for electrically controlling the shutter to a (Continued)

main open position or a bypass position. The spring for biasing the shutter is configured to bias the displacement of the shutter to the bypass position when a fluid pressure value is lower than a first threshold value.

12 Claims, 8 Drawing Sheets

(51) Int. Cl.
  *F01M 1/22* (2006.01)
  *F02C 7/224* (2006.01)
  *F16K 17/04* (2006.01)
(52) U.S. Cl.
  CPC ........ *F16K 17/04* (2013.01); *F05D 2220/323* (2013.01); *F05D 2260/213* (2013.01); *F05D 2260/98* (2013.01); *F05D 2270/09* (2013.01)

(56) References Cited

U.S. PATENT DOCUMENTS

| | | | | |
|---|---|---|---|---|
| 9,435,326 | B2* | 9/2016 | Jo | F16H 61/0267 |
| 11,187,156 | B2* | 11/2021 | Niergarth | B01D 19/0005 |
| 11,428,307 | B2* | 8/2022 | Ishiyama | F16H 57/0435 |
| 2008/0234903 | A1 | 9/2008 | Satou | |
| 2012/0055559 | A1* | 3/2012 | Pignard | F16H 57/0413 |
| | | | | 137/561 R |
| 2014/0205446 | A1* | 7/2014 | Patsouris | F02C 7/047 |
| | | | | 415/175 |
| 2018/0209346 | A1* | 7/2018 | Muller | F02C 7/25 |

FOREIGN PATENT DOCUMENTS

| | | | |
|---|---|---|---|
| GB | 626571 A | * | 7/1949 |
| WO | 2016156743 A1 | | 10/2016 |

* cited by examiner

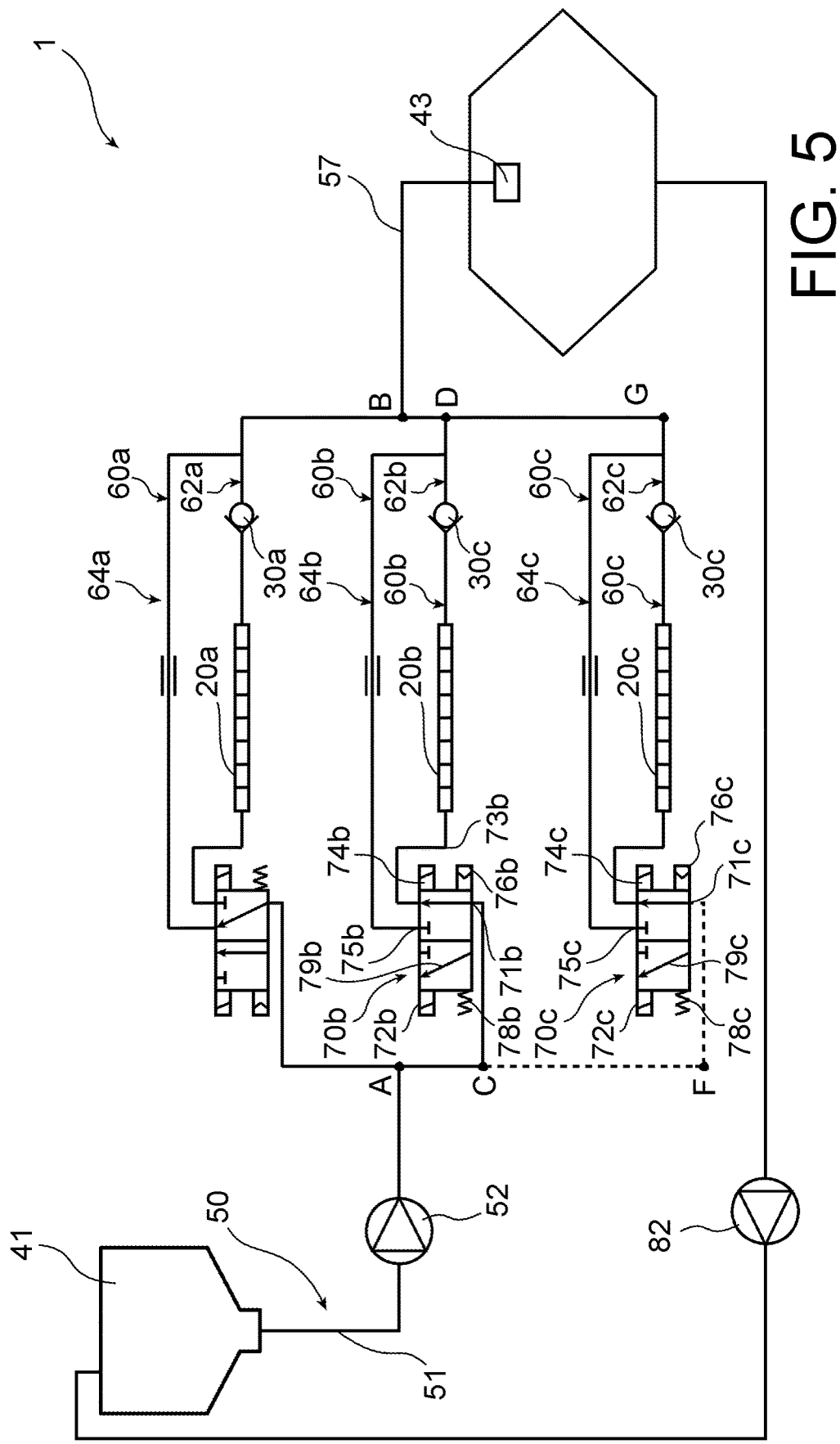

ISOLATION OF A TURBINE ENGINE HEAT EXCHANGER IN THE EVENT OF A LEAK FROM AN ELECTRICAL AND MECHANICAL HYDRAULIC CONTROL VALVE

This is the National Stage of PCT international application PCT/FR2021/050271, filed on Feb. 17, 2021 entitled "ISOLATION OF A TURBINE ENGINE HEAT EXCHANGER IN THE EVENT OF A LEAK FROM AN ELECTRICAL AND MECHANICAL HYDRAULIC CONTROL VALVE", which claims the priority of French Patent Application No. 2001739 filed Feb. 21, 2020, both of which are incorporated herein by reference in their entireties.

DESCRIPTION

Technical Field

The invention relates to the general technical field of aircraft turbine engines such as turbojet engines and turboprop engines. More specifically, it relates to the isolation of a heat exchanger which is located in a turbine engine stator blading, in the event of a leak.

Prior Art

There are turbine engines which comprise air/oil heat exchangers to cool the oil in contact with ambient air. These exchangers only operate during certain turbine engine states, to avoid cooling the oil too much in cold flight conditions or to avoid oil retention in turbine engine lubrication enclosures in cruising state of the turbine engine.

Some lubrication circuits include a thermostatic valve with solid wax at low temperature, to bypass the lubricant when the temperature of the lubricant is lower than a threshold value. Nevertheless, these thermostatic valves do not allow completely stopping the oil supply to the exchanger. They also cannot undergo a significant number of open/close cycles.

Lubrication circuits include a hydraulic valve which is configured to be opened when a difference in lubricant pressure exceeds a second threshold value, to bypass the lubricant when the temperature of the lubricant drops below a first threshold value, and the cold lubricant circulation generates higher pressure drops in the hydraulic circuit. However, these hydraulic valves do not allow completely stopping the oil supply to the exchanger. Furthermore, the operation of these hydraulic valves is unstable, which makes them difficult to use in a lubrication circuit.

Some of these air/oil heat exchangers are located in stator blading sectors and they are arranged in parallel. The oil which circulates in each exchanger is cooled by the air which comes into contact with the stator blading sector of the turbine engine.

Such a turbine engine is for example known from the application WO 2016/156743 from the Snecma Company.

Nevertheless, the blades of a stator blading sector can be damaged, for example in the event of impact with a foreign body to the turbine engine, which can lead to relatively significant oil leaks in the exchangers which are housed in these blades. If these leaks continue, the amount of oil escaping from the lubrication circuit of the turbine engine may become such that the insufficient amount of remaining oil leads to a flame-out of the turbine engine in flight.

DISCLOSURE OF THE INVENTION

The invention aims, at least partially, at solving the problems encountered in the solutions of the prior art.

In this respect, the invention relates to an assembly for a turbine engine fluid circuit. The assembly comprises a main branch which includes a heat exchanger.

According to the invention, the assembly includes a control valve of fluid to the heat exchanger. The fluid control valve comprises a fluid inlet, a main fluid outlet, a fluid bypass outlet, a shutter, resilient means for biasing the shutter, and means for electrically controlling the shutter.

The main fluid outlet is fluidly connected to the main branch. The fluid bypass outlet is fluidly connected to a bypass branch which is arranged parallel to the main branch. The shutter is movable between a main open position in which it closes the bypass outlet and it allows circulating the fluid in the main branch, and a bypass position in which it closes the main outlet and it allows circulating the fluid in the bypass branch.

The resilient means for biasing the shutter is configured to bias the displacement of the shutter so that it closes the main outlet when a fluid pressure value is lower than a first threshold value. The means for electrically controlling the shutter is configured to bias the displacement of the shutter to the main open position or the bypass position.

Thanks to the fluid control valve of the assembly according to the invention, the flow rate and the cooling of the fluid are capable of being controlled and adapted depending on the state of the turbine engine, while limiting the impact of leaks in the main branch and facilitating the detection of a leak in the main branch.

In particular, the shutter is automatically displaced to the bypass position by a mechanical hydraulic control, which limits the intervention of a digital turbine engine regulation system to isolate the heat exchanger in the event of a leak from the heat exchanger.

In particular, the pressure of the fluid in the main branch upstream of the heat exchanger is compared with the first threshold value. This is for example the pressure of the fluid at the inlet of the fluid control valve.

The invention may optionally include one or more of the following features, combined with each other or not.

The assembly comprises in particular a bladed stator sector, the heat exchanger being located in the bladed stator sector.

According to a particular embodiment, the means for electrically controlling the shutter comprises a first member for electrically controlling the shutter which is configured to bias the shutter to the main open position, in particular when the pressure value of the fluid is lower than the first threshold value.

In particular, the first electrical control member allows supplying the exchanger with fluid when starting the turbine engine.

According to another particular embodiment, the means for electrically controlling the shutter comprises a second member for electrically controlling the shutter which is configured to bias the shutter towards the bypass position, in particular when the fluid temperature is lower than a second threshold value.

The second member for electrically controlling the shutter is for example configured to stop the supply of fluid to the exchanger, while the pressure of the fluid is greater than the first threshold value, when the temperature of the fluid is abnormally low. Such a situation can occur in cruising state of the turbine engine.

According to a particular embodiment, the fluid control valve comprises a first chamber and a second chamber which are separated from each other by the shutter. The fluid control valve comprises a pressurisation inlet for bringing the fluid into the first chamber. The resilient biasing means comprises a return spring which is configured to bias the displacement of the shutter to the bypass position against the pressure of the fluid in the first chamber.

This return spring can be a tension spring located in the first chamber or a compression spring located in the second chamber.

According to another particular embodiment, the main branch comprises a check device which is configured to limit/prevent the circulation of fluid to the heat exchanger when the shutter is in the bypass position.

Preferably, the check device comprises a check valve.

According to a particular embodiment, the bypass branch comprises a hydraulic resistive element which is designed so that a hydraulic resistance value in the bypass branch is substantially equal to a hydraulic resistance value in the main branch.

Preferably, the hydraulic resistive element comprising a diaphragm.

According to another particular embodiment, the shutter of the fluid control valve is in the main open position when a temperature of the fluid is greater than the second threshold value, when a value of rotation of a turbine engine shaft is greater than a third threshold value, and no fluid leak is detected in the main branch.

The value of rotation of the turbine engine shaft can determine the fluid pressure of the assembly and be measured independently of the assembly.

According to another particular embodiment, the shutter of the fluid control valve is in the bypass position when the temperature of the fluid is strictly lower than the second threshold value, or when the value of rotation of a turbine engine shaft is strictly lower than the third threshold value, or when a fluid leak is detected in the main branch.

According to a particular embodiment, the position of the shutter of the fluid control valve is controlled by an electrical control in transient state of the fluid control valve.

According to a particular embodiment, the position of the shutter of the fluid control valve is controlled by a mechanical hydraulic control in steady state of the fluid control valve.

The electrical control of the position of the shutter allows in particular limiting the position instabilities of the shutter during a transient state of position of the shutter of the fluid control valve. In addition, the digital regulation system is likely to be biased only during the normal operation of the turbine engine to control the displacement of the shutter and only for a short time.

The mechanical hydraulic shutter position control is passive, that is to say it operates automatically without the intervention of an electronic control unit or a digital regulation system.

According to another particular embodiment, the fluid control valve comprises a safety position in which the shutter is in the bypass position, the shutter being blocked in the safety position when the shutter has been displaced from the main open position to the bypass position by a mechanical hydraulic control of the shutter.

According to a particular embodiment, the assembly comprises a leak detector configured to detect a leak in the main branch, when the shutter of the fluid control valve is displaced from the main open position to the bypass position in the absence of electrical control of displacement of the shutter to the bypass position.

According to another particular embodiment, the assembly comprises a bladed stator sector, the heat exchanger being located in the bladed stator sector.

Preferably, the bladed stator sector includes blades for straightening a secondary flow of a turbine engine.

Preferably, the bladed sector comprises a radially inner platform, a radially outer platform and at least one vane which extends between the radially inner platform and the radially outer platform.

The control valve then allows limiting a leak upon an impact of a body external to the turbine engine with the blade and when the heat exchanger inside the blade is damaged.

The invention also relates to a fluid circuit for a turbine engine. The fluid circuit comprises a first assembly for a turbine engine as defined above and a second assembly as defined above, and which is arranged fluidly in parallel with the first assembly.

According to a particular embodiment, the fluid is the lubricant. The fluid circuit comprises a lubricant supply pump and a lubrication enclosure of the turbine engine, each heat transfer assembly being fluidly located between the lubricant supply pump and the lubrication enclosure.

The invention also relates to a turbine engine comprising an assembly as defined above or a fluid circuit as defined above. The turbine engine is in particular an aircraft turbine engine. The turbine engine is preferably a bypass turbojet engine.

BRIEF DESCRIPTION OF DRAWINGS

The present invention will be better understood on reading the description of exemplary embodiments, given for illustrative purposes only and without limitation, with reference to the appended drawings in which:

FIG. 5 is a partial schematic representation of the lubrication circuit for the turbine engine according to the first embodiment, in an abnormal pressure drop state in one of the heat exchange assemblies of the lubrication circuit;

DETAILED DISCLOSURE OF PARTICULAR EMBODIMENTS

Figure 1:
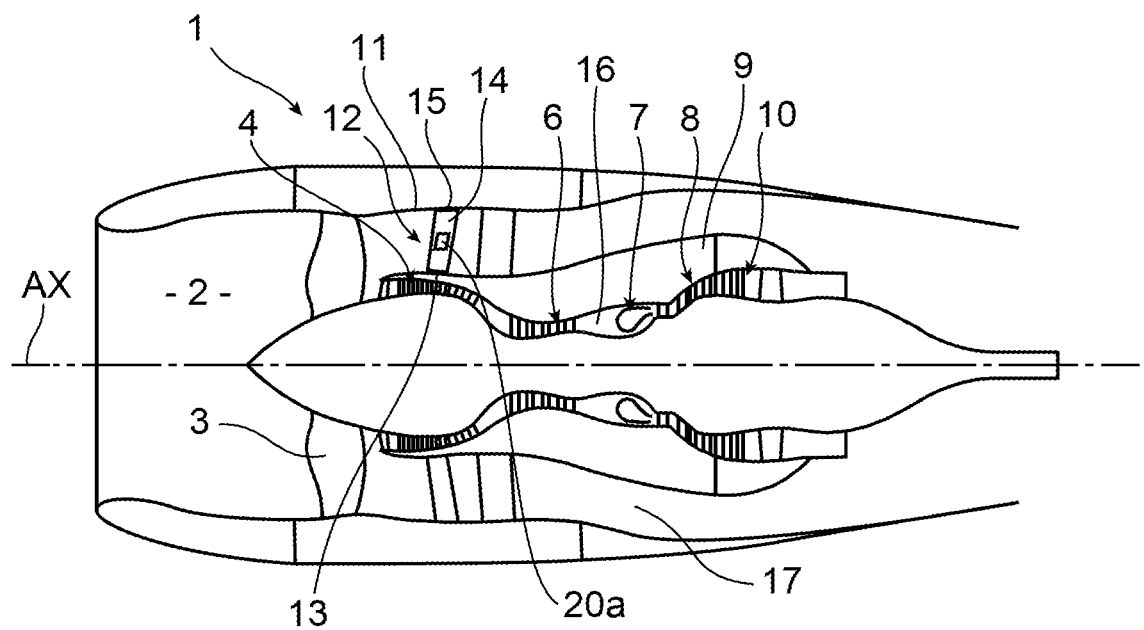
FIG. 1 is a partial schematic representation in longitudinal section of a turbine engine for an aircraft, according to a first preferred embodiment.

Identical, similar or equivalent portions of the different figures bear the same reference numerals so as to facilitate passage from one figure to another.

FIG. 1 represents a bypass and twin-spool turbine engine. The turbine engine 1 is a turbojet engine which has a shape of revolution about a longitudinal axis AX.

The turbine engine 1 comprises, on the path of a primary flow path 16 of a primary flow, an air inlet sleeve 2, a fan 3, a low pressure compressor 4, a high pressure compressor 6, a combustion chamber 7, a high pressure turbine 8 and a low pressure turbine 10.

A radial direction is a direction orthogonal to the longitudinal axis AX and secant with this axis. A circumferential direction is defined as a direction which is locally orthogonal to a radial direction and to the direction of the longitudinal axis AX.

Generally, the term "air" designates any gas likely of being used as an oxidizer in the turbine engine 1.

The low pressure compressor 4, the high pressure compressor 6, the high pressure turbine 8 and the low pressure turbine 10 delimit a secondary flow 17 for the flow of a secondary flow which bypasses them.

The high pressure compressor 6 and the high pressure turbine 8 are mechanically connected by a shaft for driving the high pressure compressor 6, so as to form a high pressure body of the turbine engine 1. Similarly, the low pressure compressor 4 and the low pressure turbine 10 are mechanically connected by a turbine engine shaft 1, so as to form a low pressure body of the turbine engine 1.

The low pressure compressor 4, the high pressure compressor 6, the combustion chamber 7, the high pressure turbine 8 and the low pressure turbine 10 are surrounded by an inner fairing 9 which extends from the inlet sleeve 2 to the low pressure turbine 10.

This inner fairing 9 is surrounded by an outer casing 11 which delimits the turbine engine radially outwardly relative to the longitudinal axis AX. The outer casing 11 delimits the secondary flow path 17 radially outwardly, in particular at the fan 3.

The turbine engine 1 comprises at least one first bladed sector 12 and one second bladed sector 12 which each extend between the inner fairing 9 and the outer casing 11. The bladed sectors 12 are bladed stator sectors.

The bladed sectors 12 each comprise a radially inner platform 13, a radially outer platform 15 and at least one blade 14 between the radially inner platform 13 and the radially outer platform 15.

The radially inner platform 13 of each bladed sector 12 is rigidly secured to the inner fairing 9. It is delimited radially outwardly by a first aerodynamic surface which is in contact with the air of the secondary flow path 17.

The radially outer platform 15 of each bladed sector 12 is rigidly secured to the outer casing 11. It is delimited radially inwardly by a second aerodynamic surface which is in contact with the air of the secondary flow path 17.

The blades 14 of each bladed sector 12 extend radially from the radially inner platform 13 to the radially outer platform 15. These blades 14 are spaced from each other in a circumferential direction of the bladed sector 12. In the represented embodiment, each of the blades 14 is a blade for straightening a secondary flow of the turbine engine.

A first blade 14 of the first bladed sector 12 houses a first heat exchanger 20a. In the represented embodiment, this first blade 14 also houses a first hydraulic control valve 70a and a first check device 30a.

A second blade 14 of the second bladed sector 12 houses a second heat exchanger 20b. In the represented embodiment, this second blade 14 also houses a second hydraulic control valve 70b and a second check device 30b.

A third blade 14 of one of the bladed sectors 12 houses a third heat exchanger 20c. In the represented embodiment, this third blade 14 also houses a third hydraulic control valve 70c and a third check device 30c.

Figure 2:
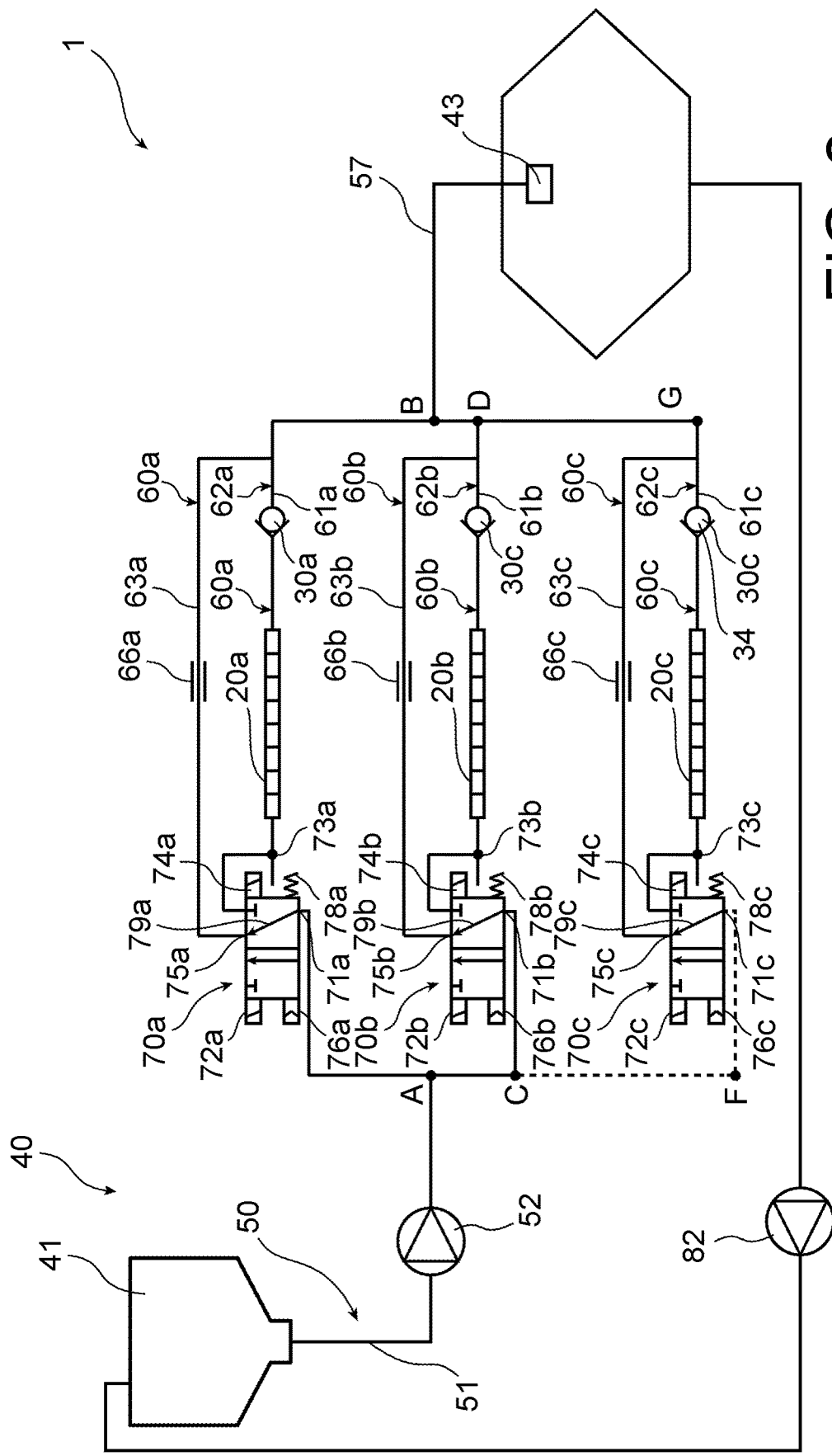
FIG. 2 is a partial schematic representation of a lubrication circuit for the turbine engine according to the first embodiment, when starting the turbine engine.
Figure 3:
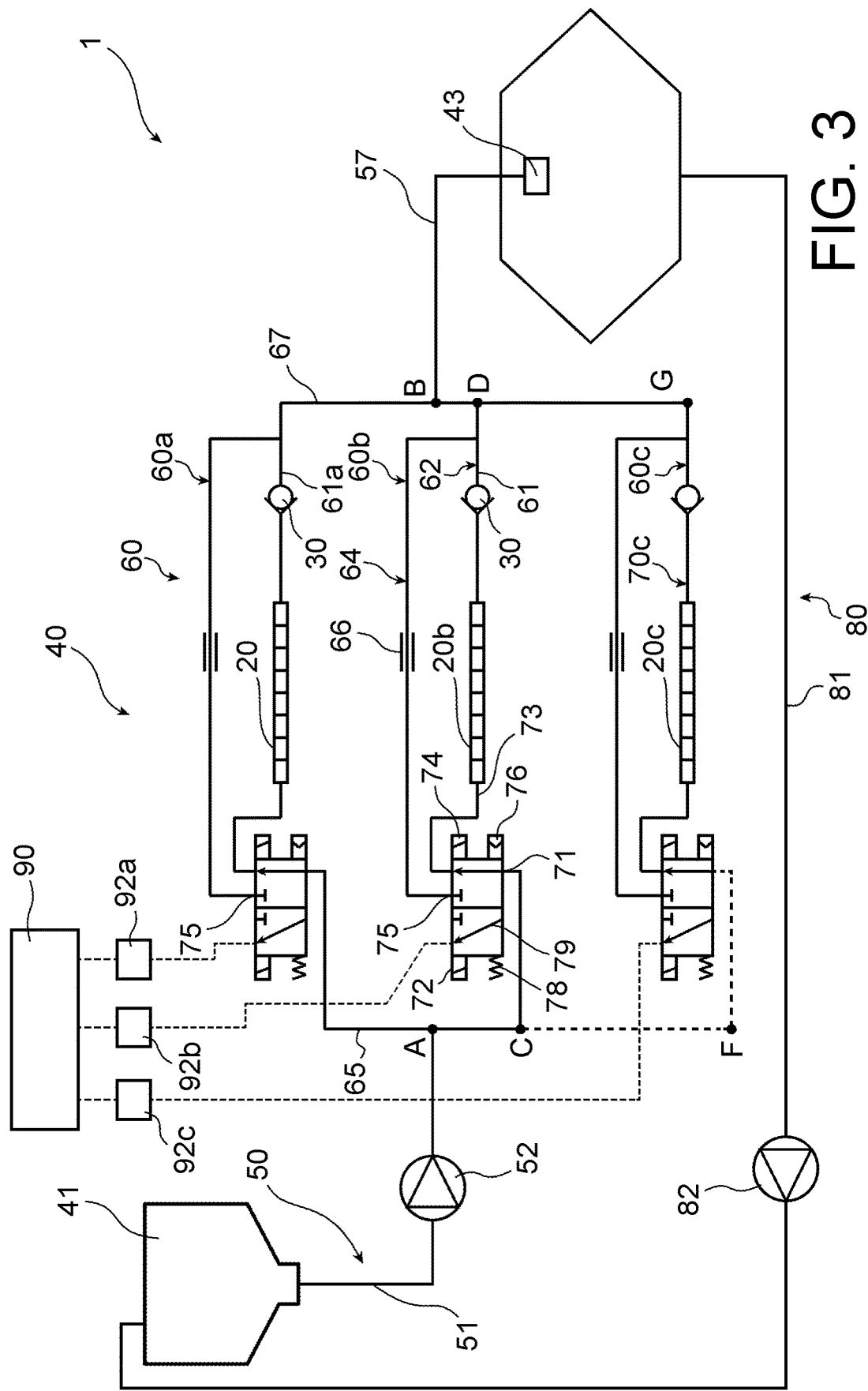
FIG. 3 is a partial schematic representation of the lubrication circuit for the turbine engine according to the first embodiment, in a turbine engine lubricant cooling state.

With reference to FIG. 2 and FIG. 3, the turbine engine 1 comprises a fluid circuit 40. In the represented embodiment, the fluid is lubricant, typically oil. The fluid circuit 40 is then a lubrication circuit.

The lubrication circuit 40 comprises a reservoir 41, a lubricant supply circuit 50, at least one lubrication enclosure 43 and a lubricant return circuit 80. The lubrication circuit 40 is configured to circulate the lubricant in a closed loop between the supply circuit 50 and the return circuit 80.

The lubrication enclosure 43 is an enclosure inside which the lubricant is used to lubricate and/or cool components (not represented) of the turbine engine 1, such as shafts and/or bearings. The lubrication enclosure 43 is typically a bearing lubrication enclosure of the turbine engine 1.

The lubricant return circuit 80 is configured to circulate lubricant from each lubrication enclosure 43 to the reservoir 41. It comprises a return pump 82 and a return conduit 81.

The return pump 82 is for example a volumetric or centrifugal pump which is configured to deliver lubricant originating from the lubrication enclosure 43 to the reservoir 41, through the return conduit 81.

The lubricant supply circuit 50 comprises, from upstream to downstream, an upstream pipe 51, a supply pump 52, a cooling circuit 54, and a dispensing conduit 57.

Generally, the upstream and downstream directions are used, in the present document, with reference to the overall direction of overall fluid flow in the fluid circuit 40.

The supply pump 52 is for example a volumetric or centrifugal pump which is configured to deliver lubricant from the reservoir 41 to the lubrication enclosure 43, through the upstream conduit 51.

The upstream conduit 51 comprises one or more conduits. It fluidly connects the reservoir 41 to the cooling circuit 54.

The dispensing conduit 57 comprises one or more conduits. It fluidly connects the cooling circuit 54 to the lubrication enclosure 43.

The cooling circuit 54 comprises a first thermal assembly 60a, a second thermal assembly 60b and at least one third thermal assembly 60c which are arranged two by two in parallel.

The first thermal assembly 60a is fluidly connected, by a first inlet node A, to the upstream conduit 51 and it is fluidly connected, by a first outlet node B, to the dispensing conduit 57. The second thermal assembly 60b is fluidly connected, by a second node input C, to the upstream conduit 51 and it is fluidly connected, by a second outlet node D, to the dispensing conduit 57. The third thermal assembly 60c is fluidly connected, by a third inlet node F, to the upstream conduit 51 and it is fluidly connected, by a third outlet node G, to the dispensing conduit 57.

In the represented embodiment, the inlet nodes A, C, F are substantially coincident and the outlet nodes B, D, G are substantially coincident.

In the present disclosure, the heat exchange assemblies 60 are each of identical structure. Their constituent elements have the same reference numerals, with the additional letter a in reference specifically to the first heat exchange assembly 60a, with the additional letter b in reference specifically to the second heat exchange assembly 60b, and with the additional letter c in reference specifically to the third heat exchange assembly 60c.

Each thermal assembly 60 includes an inlet conduit 65, a main branch 62, a bypass branch 64, a hydraulic control valve 70, and an outlet conduit 67.

The inlet conduit 65 of each of the thermal assemblies 60 is connected to the upstream conduit 51 by the inlet node thereof. The outlet conduit 67 of each of the thermal assemblies 60 is connected to the dispensing conduit 57 by the outlet node thereof. The main branch 62 and the bypass branch 64 are arranged in parallel to each other, by each being connected to the inlet conduit 65 and to the outlet conduit 67.

The main branch 62 of each of the thermal assemblies 60 comprises, from upstream to downstream, one of the heat exchangers 20 and a check device 30 which are fluidly connected by a main conduit 61.

Each of the heat exchangers 20 is configured to cool the lubricant of the main branch 62 in contact with the air which circulates around the blades 14 of the stator in the secondary flow path 17.

Each check device 30 comprises a check valve in the represented embodiment. The check device 30 is configured to limit/prevent the circulation of fluid through the heat exchanger 20, when the shutter 79 of the hydraulic control valve 70 is in the bypass position to direct the lubricant to the bypass branch 64.

The bypass branch 64 of each of the thermal assemblies 60 comprises a hydraulic resistive element 66 and a bypass conduit 63.

Generally, the hydraulic resistive element 66 is designed so that a hydraulic resistance value in the bypass branch 64 is substantially equal to a hydraulic resistance value in the main branch 62.

In the present disclosure, a hydraulic resistance of an element of the lubrication circuit 40 is defined, by analogy with the field of electricity, as the magnitude of the ratio of the pressure drop through this element to the flow rate of lubricant passing through this element. By metonymy and always by analogy with the field of electricity, a hydraulic resistance or hydraulic resistive element corresponds to an element of the lubrication circuit 40 which is characterised by the value of its hydraulic resistance.

In the represented embodiment, the hydraulic resistive element 66 comprises a diaphragm. The lubrication circuit 40 comprises a first diaphragm 66a, a second diaphragm 66b and a third diaphragm 66c.

Each hydraulic control valve 70 is also referred to as a fluid control valve 70 in the present disclosure. It comprises a main lubricant inlet 71, a pressurisation inlet 77, a shutter 79, means for controlling the shutter, a main outlet 73, and a bypass outlet 75.

The lubricant control valve 70 comprises a first chamber and a second chamber which are separated from each other by the shutter 79 which is a slide valve in the represented embodiment. The control means comprises in particular a return spring which may be a tension spring located in the first chamber and/or a compression spring located in the second chamber, to bias the displacement of the shutter 79 against the lubricant pressure in the first chamber.

The shutter 79 is movable between a main open position and a bypass position. In the represented embodiment, each hydraulic control valve 70 is bistable. The main open position is a first stable open position of the shutter 79 and the bypass position is a second stable open position of the shutter 79.

In the main open position, the shutter 79 closes the bypass outlet 75 and it allows fluid to circulate into the main branch 62 through the main outlet 73. In the bypass position, the shutter 79 closes the main outlet 73 and it allows fluid to circulate into the bypass branch 64 through the bypass outlet 75.

The lubricant control valve 70 comprises a safety position in which the shutter 79 is blocked, when the shutter 79 has been displaced from the main open position to the bypass position by a mechanical hydraulic control of the shutter 79. The safety position of the shutter 79 is the bypass position.

The main inlet 71 of each hydraulic control valve is fluidly connected to the inlet conduit 65 of the corresponding heat exchange assembly 60.

With joint reference to FIGS. 2 to 5, the pressurisation inlet 77 is fluidly connected by a pressurisation conduit 69 to the inlet conduit 65 of the heat exchange assembly 60. The pressurisation inlet 77 is designed to bring fluid in the first chamber of the hydraulic control valve 70. The pressurisation conduit 69 is designed to perform a pressure tapping of the lubricant. The pressure of the lubricant at the pressurisation inlet 77 is in particular substantially identical to that of the main inlet 71.

The main fluid outlet 73 is fluidly connected to the main branch 62 upstream of the heat exchanger 20 and the check device 30.

The fluid bypass outlet 75 is fluidly connected to the bypass branch 64 upstream of the hydraulic resistive element 66.

With joint reference to FIGS. 2 to 5, the means for controlling each shutter 79 comprises means 72, 74 for electrically controlling the shutter, resilient means 78 for biasing the shutter, and a means 76 for hydraulic control of the shutter.

The resilient means 78 for biasing the shutter and the means 76 for hydraulic control of the shutter control the displacement of the shutter 79 in steady state of the hydraulic control valve 70.

The resilient means 78 for biasing the shutter comprises the return spring which is configured to bias the displacement of the shutter 79 to the bypass position against the pressure of the lubricant in the first chamber. It is configured to bias the displacement of the shutter 79 to the bypass position when the pressure of the lubricant at the main inlet 71 is lower than a first threshold value. In particular, the lubricant pressure is a value of pressure of the fluid in the main branch 62 upstream of the heat exchanger 20.

The means 76 for hydraulic control of the shutter comprises the pressurisation inlet 77 and the pressurisation conduit 69. It is configured to bias the displacement of the shutter 79 to the main open position when the lubricant pressure at the main input 71 is greater than the first threshold value.

The resilient means 78 for biasing the shutter and the hydraulic control means 76 are used in particular to automatically control the displacement of the shutter by a mechanical hydraulic control to the bypass position in the event of an abnormal pressure drop in the main branch 62 during of the flight of turbine engine 1.

The means 72, 74 for electrically controlling the shutter is configured to control the displacement of the shutter 79 to the main open position or the bypass position. It is configured to control the displacement of the shutter 79 in transient state of the hydraulic control valve 70.

The term "transient state of the hydraulic control valve 70" means a transient operating phase of the hydraulic control valve 70. In other words, it is an operating phase during which the position of the shutter 79 of the hydraulic control valve 70 is not the one it would have in a steady-state of the turbine engine. The term "steady state of the hydraulic control valve 70" means a substantially permanent operation phase of the hydraulic control valve 70. In other words, it is an operation of the hydraulic control valve 70 during which the position of the shutter 79 of the hydraulic control valve 70 corresponds to the one it would have in a steady-state of the turbine engine.

The means 72, 74 for electrically controlling the shutter comprises a first member 72 for electrically controlling the shutter and a second member 74 for electrically controlling the shutter.

The first member 72 for electrically controlling the shutter is configured to control the displacement of the shutter 79 to the main open position against the control of the shutter 79 by the resilient means 78 for biasing the shutter, in particular when the pressure of the lubricant is lower than the first threshold value.

The first member 72 for electrically controlling the shutter is in particular configured to displace the shutter 79 to the main open position when the temperature of the lubricant is greater than a second threshold value and the pressure of the lubricant is likely to be lower than the first threshold value.

The first member 72 for electrically controlling the shutter is used, for example, to displace the shutter 79 to the main open position in a first transient state 201 of starting the turbine engine 1 or in a third transient state of conveying the lubricant to the corresponding heat exchanger 20.

The second member 74 for electrically controlling the shutter is configured to control the displacement of the shutter 79 towards the bypass position against the control of the hydraulic control means 76, in particular when the temperature of the lubricant is lower than a second threshold value.

The second member 74 for electrically controlling the shutter is configured to stop the supply of lubricant to the main branch 62, when the pressure of the lubricant is greater than the first threshold value and the temperature of the lubricant is lower than the second threshold value. Such a situation can occur in cruising state of the turbine engine 1.

Figure 6:
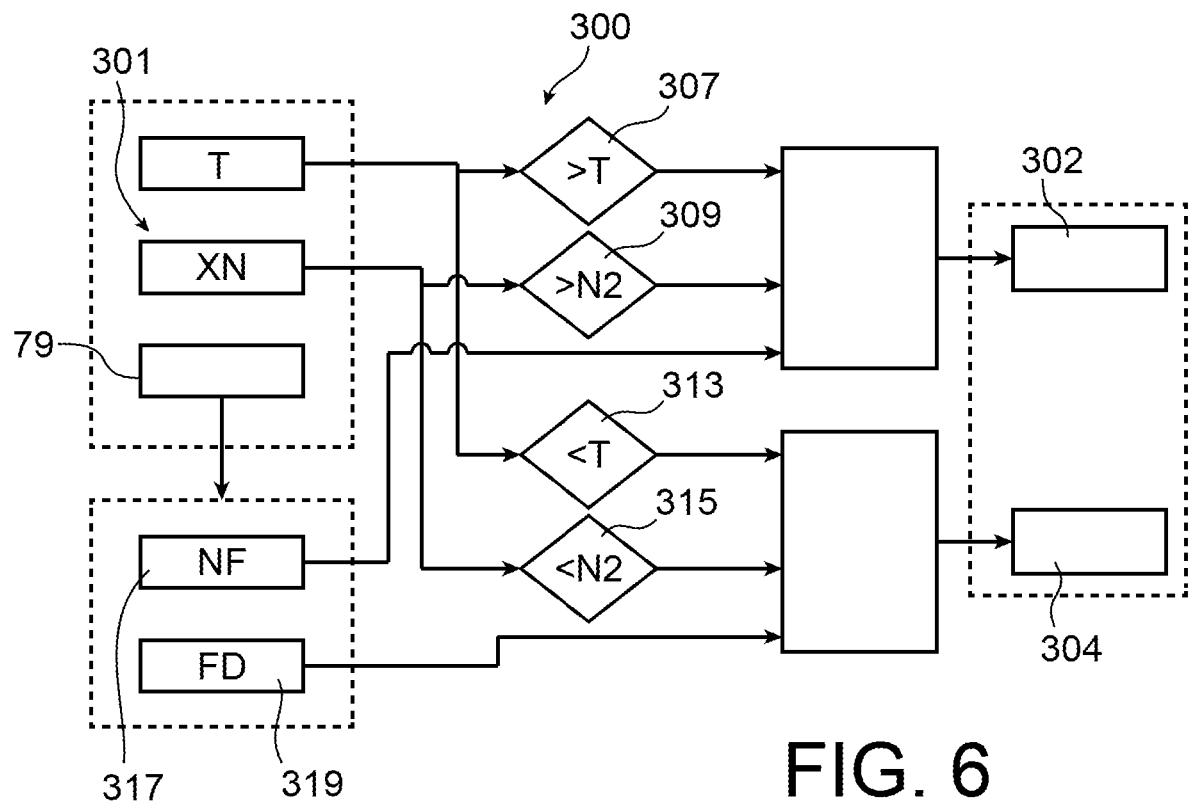
FIG. 6 illustrates a method for controlling the position of the shutter of a fluid control valve of the lubrication circuit from parameters of the turbine engine.

FIG. 6 represents a method 300 for controlling the position of the shutter 79 of each hydraulic control valve 70 from operating parameters of the turbine engine.

In the embodiment, the pressure of the lubricant at the main inlet 71 of each hydraulic control valve 70 is greater than the first threshold value when the value XN of rotation of a turbine engine shaft is greater than a third threshold value.

The input parameters 301 taken into account for the control of each hydraulic control valve 70 by the corresponding control means comprise the temperature T of the lubricant, the value XN of rotation of a shaft of the high pressure body of the turbine engine 1, and the position of the shutter 79 of the hydraulic control valve from its main open position and its bypass position.

The method 300 for controlling the position of the shutter 79 takes into account the absence of leak detection 317 in the main branch 62 of the heat exchange assembly 60, or else the detection of a leak 319 in the main branch 62 of the heat exchange assembly 60.

The means for controlling each shutter 79 controls the position of the shutter 79 so that it is in the main open position in step 302, when the temperature T of the lubricant is greater than the second threshold value in step 307, and the value XN of rotation of the turbine engine shaft is greater than the third threshold value in step 309, and in the absence of leak detection 317 in the main branch 62.

The means for controlling each shutter 79 controls the position of each shutter 79 so that it is in the bypass position in step 304, when the temperature T of the lubricant is strictly lower than the second threshold value in step 313, or else when the value of rotation of the turbine engine shaft is strictly lower than the third threshold value 315, or else when a lubricant leak is detected in the main branch 62 in the leak detection step 319.

The method for controlling each shutter 79 of hydraulic control valve 70 from the state of the turbine engine 1 is now described with reference to FIGS. 4*a* to 4*f*.

When starting the turbine engine, each hydraulic control valve 70 is in a first transient starting state 201, in which the pressure of the lubricant at the main inlet 71 is lower than the first threshold value and the temperature of the lubricant is greater than the second value threshold. The pressure of the lubricant in the supply circuit 50 increases as the speed of rotation of the shaft of the high pressure body increases. The first electrical control member 72 controls the displacement of the shutter 79 from the bypass position to the main open position against the resilient means 78 for biasing the shutter. The electrical control of the position of the shutter 79 to the main open position, according to the arrow 91, is maintained by the first electrical control member 72 as long as the pressure of the lubricant is not stably greater than the first threshold value.

In a first flight state with cooling of the turbine engine, each hydraulic control valve 70 is in a first stable cooling state 203, in which the pressure of the lubricant at the main inlet 71 is greater than the first threshold value and the temperature of the lubricant is greater than the second threshold value. The position of the shutter 79 is controlled in a mechanical hydraulic manner by the hydraulic control means 76 and the resilient means 78 for biasing the shutter, according to the arrow 93. The shutter 79 is in the main open position and the lubricant circulates in the main branch 62 while being cooled in the heat exchanger 20.

When the turbine engine 1 is at altitude and the temperature of the lubricant becomes too low to cool the lubricant in the heat exchangers 20, each hydraulic control valve 70 is in a second transient bypass state 205, in which the temperature of the lubricant becomes lower than the second threshold value. The second electrical control member 74 controls the displacement of the shutter 79 from the main open position to the bypass position against the means 76 for hydraulic control of the shutter 79. The electrical control of the position of the shutter 79 in the bypass position, according to the arrow 94, is maintained by the second electrical control member 74 as long as the pressure of the lubricant is not stably lower than the first threshold value.

In a first flight state with cooling of the turbine engine, each hydraulic control valve 70 is in a second steady lubricant diversion state 207, in which the lubricant pressure at the main inlet 71 is lower than the first threshold value and the temperature of the lubricant is lower than the second threshold value. The position of the shutter 79 is controlled by mechanical hydraulic control, according to the arrow 95, by the hydraulic control means 76 and by the resilient means 78 for biasing the shutter. The shutter 79 is in the bypass position and lubricant circulates through the bypass branch 64 without being cooled in the heat exchanger 20.

When the turbine engine 1 drops in altitude and the lubricant needs to be cooled in the heat exchangers 20, each hydraulic control valve 70 is in a third transient state 209 for conveying the lubricant in the main branch 62, in which the temperature of the lubricant becomes greater than the second threshold value. The first electrical control member 72 controls the displacement of the shutter 79 from the bypass position to the main open position against the resilient means 78 for biasing the shutter. The electrical control of the position of the shutter 79 in the main open position, according to the arrow 97, is maintained by the first electrical control member 72 as long as the pressure of the lubricant is not stably greater than the first threshold value.

Figure 4A:
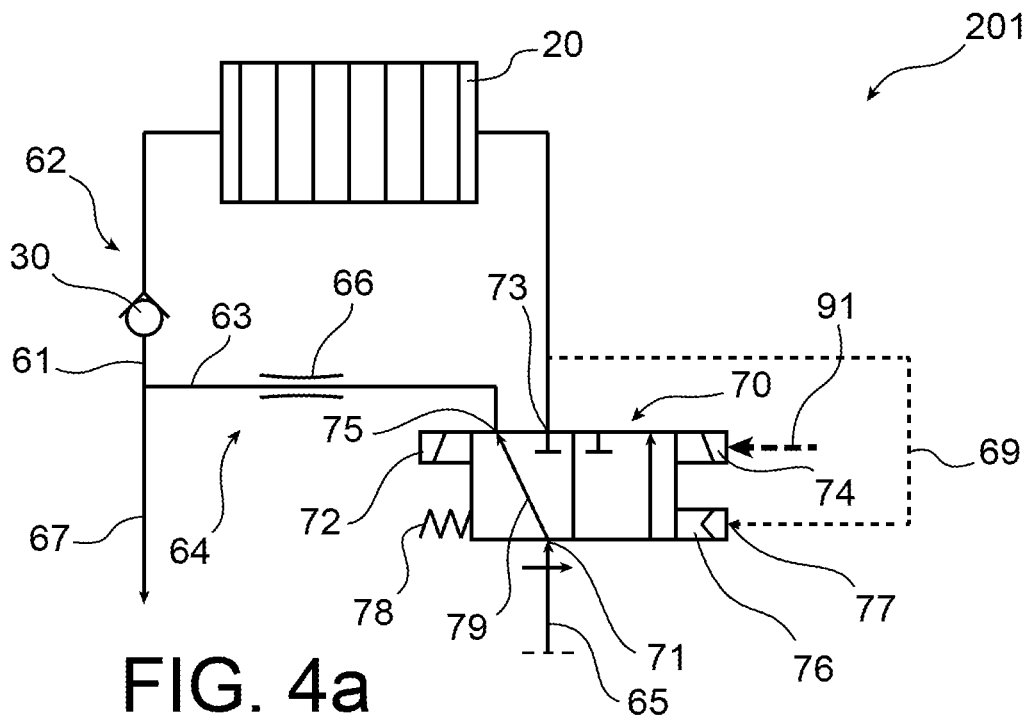
FIG. 4a is a partial schematic representation of a heat exchange assembly of the lubrication circuit in a first transient state when starting the turbine engine.
Figure 4B:
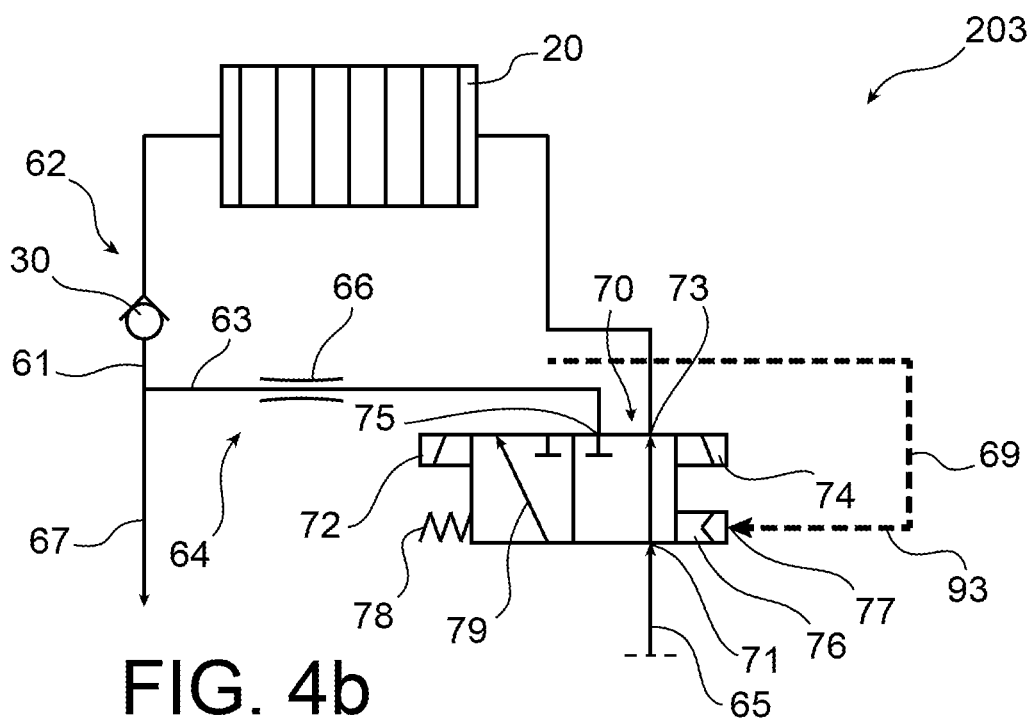
FIG. 4b is a partial schematic representation of a heat exchange assembly of the lubrication circuit after starting the turbine engine.
Figure 4C:
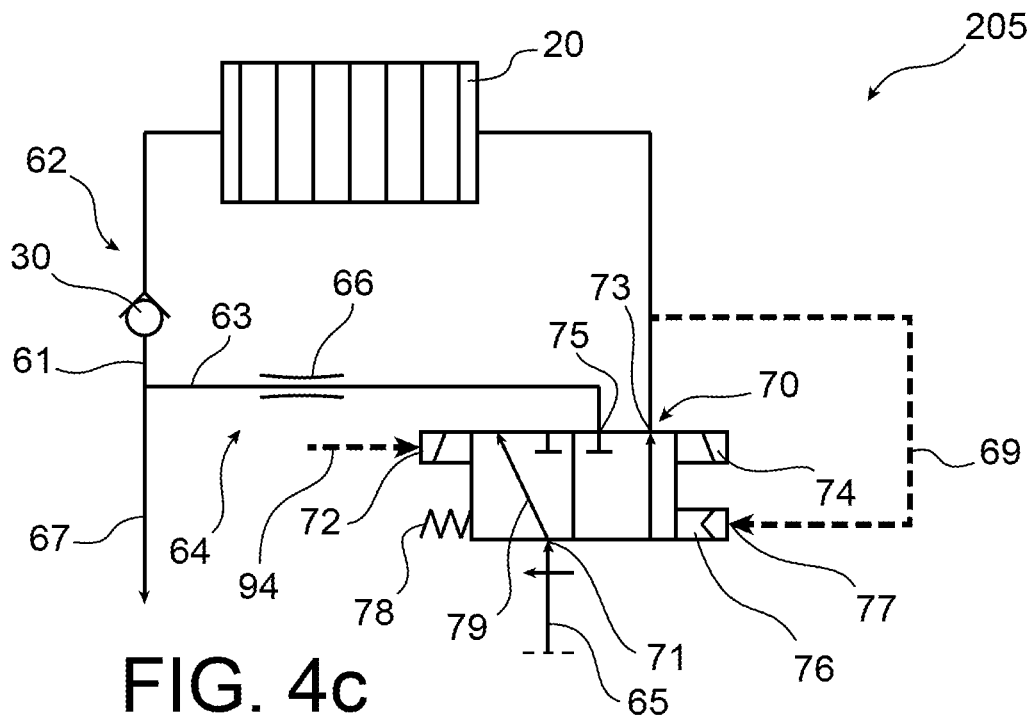
FIG. 4c is a partial schematic representation of a heat exchange assembly of the lubrication circuit during a second transient state of the heat exchange assembly.
Figure 4D:
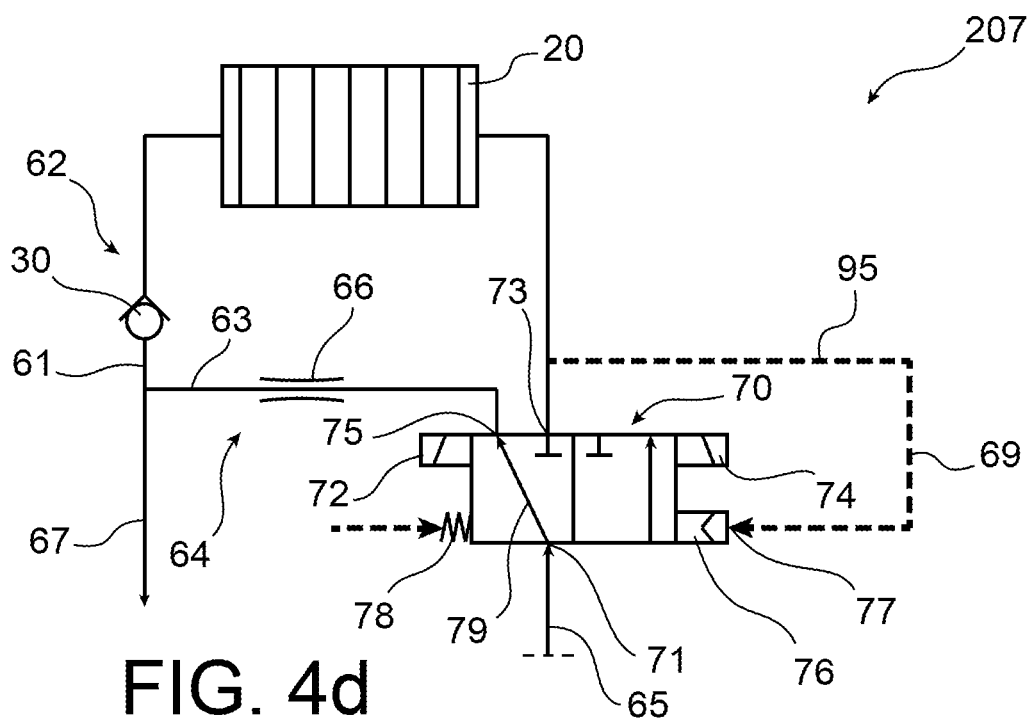
FIG. 4d is a partial schematic representation of a heat exchange assembly of the lubrication circuit in a cruising state of the turbine engine.
Figure 4E:
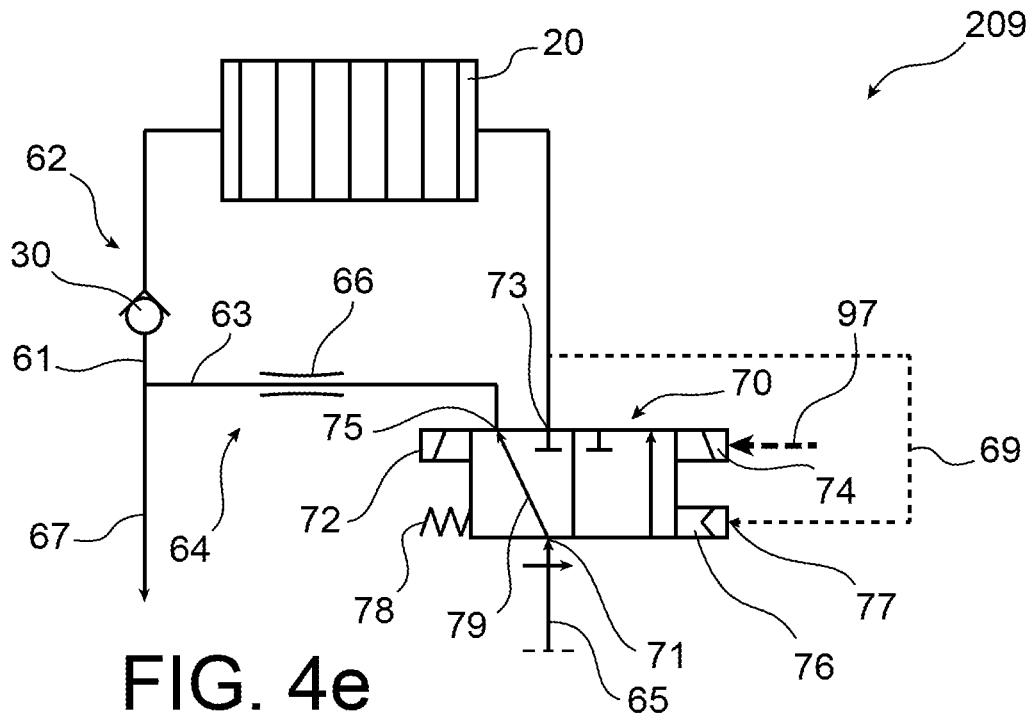
FIG. 4e is a partial schematic representation of a heat exchange assembly of the lubrication circuit during a third transient state of the heat exchange assembly.
Figure 4F:
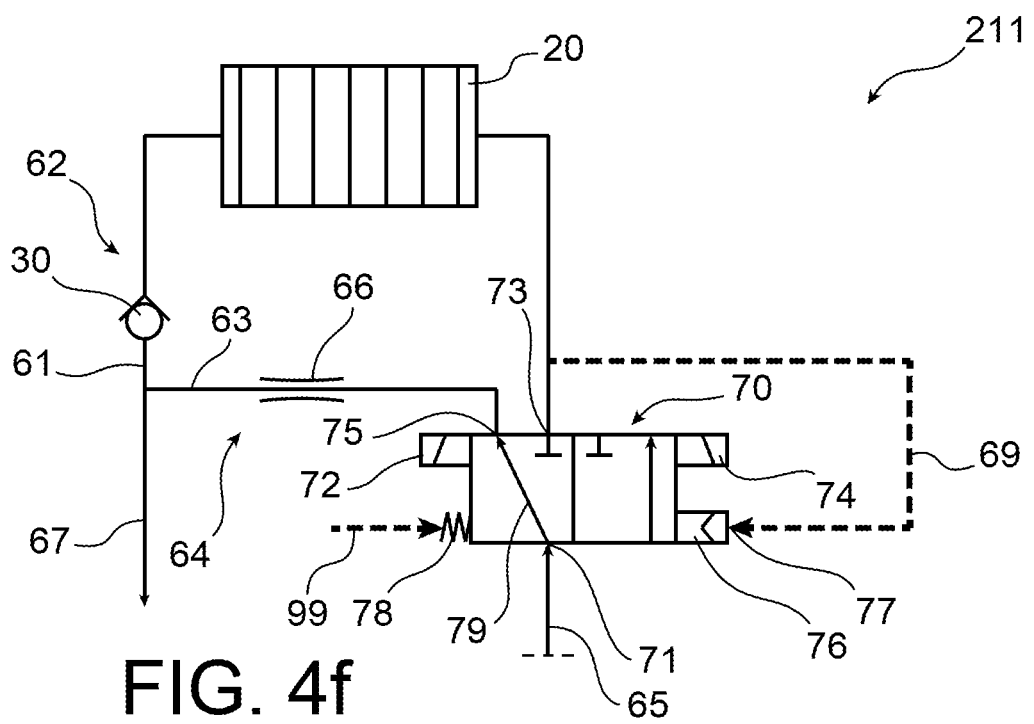
FIG. 4f is a partial schematic representation of a heat exchange assembly of the lubrication circuit in an abnormal pressure drop state in the heat exchange assembly.

With more specific reference to FIG. 4f and FIG. 5, when a leak occurs in the main branch 62 of one of the defective heat exchange assemblies 60 in steady state of the turbine engine and when the shutter 79 is in the main open position, the hydraulic control valve 70 of the defective heat exchange assembly 60 switches to an emergency diversion state 211. The pressure of the lubricant drops rapidly below the first threshold value, the resilient means 78 for biasing the shutter controls the displacement of the shutter 79 from the main open position to the bypass position against the hydraulic control means 76, according to the arrow 99. The shutter 79 of this hydraulic control valve 70 is then blocked in the bypass position which is the safety position of the shutter 79 until the end of the flight of the turbine engine 1. The lubricant of this heat exchange assembly 60 circulates entirely in the bypass branch 64 of the heat exchange assembly 60.

Due to the diaphragm 66 of the bypass branch 64, the pressure and the flow rate of lubricant remain unchanged in the heat exchange assemblies which are arranged in parallel with the defective heat exchange assembly 60.

Figure 7:
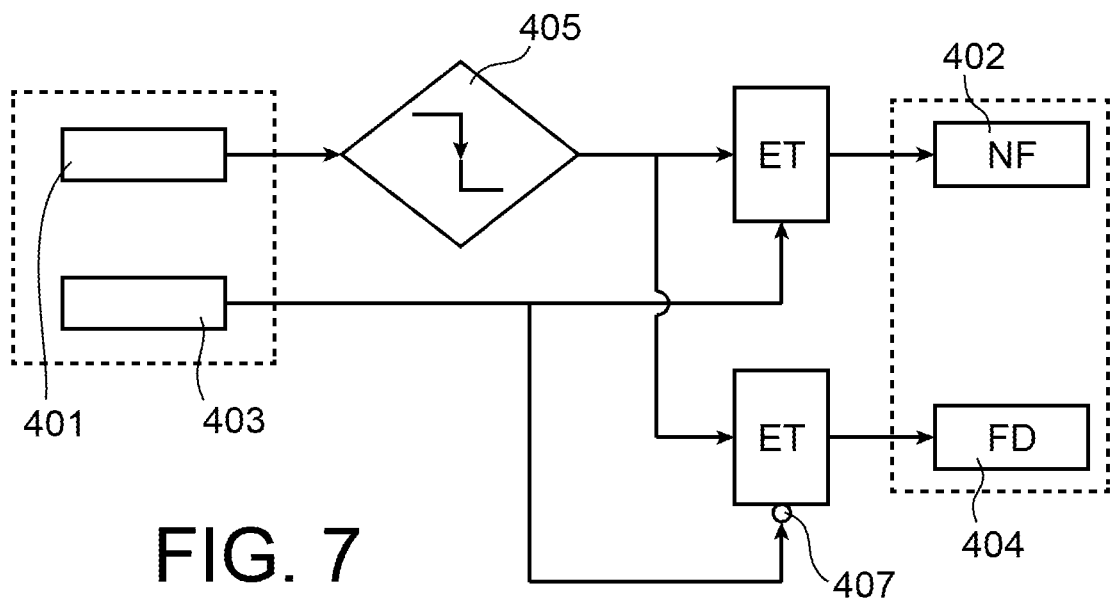
FIG. 7 illustrates a method for controlling the position of the shutter of a fluid control valve of the lubrication circuit from the position of the shutter and a shutter position control.

The leak detection method 400 of each shutter 79 of the hydraulic control valve 70 is now described with joint reference to FIG. 2 and FIG. 7.

The turbine engine 1 comprises a system for monitoring the position of each shutter and for detecting leak. This position monitoring system for each shutter 79 includes sensors 92 and the digital regulation system 90 of the turbine engine.

The sensors 92a, 92b, 92c are configured to perform a measurement enabling the digital regulation system 90 to determine the position of each shutter 79 of the hydraulic control valve. Each sensor 92a, 92b, 92c comprises for example a linear position sensor of each shutter which is known as an "LVDT" sensor.

The turbine engine digital regulation system 90 is also known as "FADEC". It comprises a redundant two-channel and full authority digital computer. It is configured to determine the position of each shutter 79 from the measurements performed by the sensors 92 and to implement the leak detection method 400.

The leak detection method 400 includes the determination of the position of each shutter 79 in step 401, in particular by the digital regulation system 90 from the measurements performed by the sensors 92a, 92b, 92c.

The leak detection method 400 includes a step 403 of verifying the presence of an electrical control of displacement of each shutter 79 to its bypass position, by the second member 74 for electrically controlling the shutter.

The leak detection method 400 comprises verifying a position displacement of each shutter 79 from its main open position to its bypass position, in step 405.

When a shutter 79 has been displaced from its main open position to its bypass position following an electrical control of displacement of the shutter 79 to its bypass position, the leak detection method 400 detects an absence of a leak in the main branch 62 of the corresponding heat exchange assembly 60, in step 402.

When a shutter 79 has been displaced from its main open position to its bypass position in the absence of an electrical control of displacement of the shutter 79 to its bypass position, the leak detection method 400 detects a leak in the main branch 62 of the corresponding heat exchange assembly 60, in step 404.

Thanks to the hydraulic control valve 70 of each thermal assembly 60 according to the invention, the flow rate and the cooling of the lubricant are capable of being controlled and adapted depending on the speed of the turbine engine 1, while limiting the impact of leaks in the main branch 62 and facilitating the leak detection in the main branch 62.

The shutter 79 of each hydraulic control valve 70 is displaced in particular automatically to the bypass position by a mechanical hydraulic control, which limits the intervention of the digital regulation system 90 of the turbine engine to isolate the heat exchanger 20 in the event of a leak from the heat exchanger 20.

Of course, various modifications can be made by the person skilled in the art to the invention which has just been described without departing from the scope of the disclosure of the invention.

Alternatively, the turbine engine 1 is a turboshaft engine or a turboprop engine.

Alternatively, the fluid is fuel. The fluid circuit 40 is then a fuel circuit for a turbine engine 1.

Each of the main branches 62 and each of the bypass branches 64 is of variable structure. In particular, the arrangement, the number and the nature of the hydraulic resistive elements in the lubrication circuit 40 can vary.

The structure of each the hydraulic resistive elements 66 of the lubrication system can vary. For example, each of these hydraulic resistive elements 66 can include a heat exchanger, a filter, a cut-off gate and/or a flowmeter.

The number of heat exchangers 20 of each main branch 62 can vary. Each main branch 62 can include at least one filter or another type of hydraulic resistive element.

Each bypass branch 64 can comprise at least one heat exchanger.

Alternatively, the supply circuit 50 can comprise at least two heat exchange assemblies 60 which are arranged in series.

The structure of each hydraulic control valve 70 can vary, in particular as long as each hydraulic control valve 70 allows circulating the lubricant in the main branch 62 at least for certain operating states of the turbine engine 1, and as it directs the lubricant to the bypass branch 64 in other operating states of the turbine engine 1 and in the event of a leak.

Alternatively, at least one of the hydraulic control valves 70 is pneumatically controlled at least in steady state of the turbine engine.

Alternatively, at least one of the hydraulic control valves 70 comprises at least one stable open position between the main open position and the bypass position, in which the shutter 79 of the hydraulic control valve partially supplies the corresponding main branch 62 and partially supplies the corresponding bypass branch 64.

At least one of the hydraulic control valves 70 can comprise a plurality of stable opening positions between the main opening position and the bypass position, for example a continuity of stable opening positions or a series of discrete stables opening positions.

More generally, each hydraulic control valve 70 can be another type of control valve than a three-way, two-position hydraulic control valve.

Alternatively, the shutter 79 of each hydraulic control valve can comprise a valve instead of a slide valve.

The hydraulic control valves 70 can be of structures which are different from each other.

According to a variant, the device for supervising the position of each shutter is for example configured to determine a lubricant pressure in the main branch 62, for example by means of a first pressure sensor 92, and to determine a lubricant pressure in the bypass branch 64, for example by means of a second pressure sensor 92. The supervision device can monitor the position of the shutter 79 by comparing the lubricant pressure value in the main branch 62 and the lubricant pressure value in the bypass branch 64.

What is claimed is:

1. An assembly for a fluid circuit of a turbine engine, comprising:
    a main branch comprising a heat exchanger,
    wherein the assembly includes a control valve of fluid to the heat exchanger, the fluid control valve comprises:
    a fluid inlet,
    a main fluid outlet which is fluidly connected to the main branch,
    a fluid bypass outlet which is fluidly connected to a bypass branch which is arranged parallel to the main branch,
    a shutter which is movable between a main open position in which it closes the bypass outlet and it allows circulating the fluid in the main branch, and a bypass position in which it closes the main outlet and it allows circulating the fluid in the bypass branch,
    resilient means for biasing the shutter which is configured to bias the displacement of the shutter so that it closes the main outlet when a fluid pressure value is lower than a first threshold value, wherein the resilient means comprise a spring, and
    electrical control means for electrically controlling the shutter configured to bias the displacement of the shutter to the main open position or the bypass position.

2. The assembly for a turbine engine according to claim 1, wherein the electrical control means for electrically controlling the shutter comprises a first member for electrically controlling the shutter which is configured to bias the shutter to the main open position.

3. The assembly for a turbine engine according to claim 1, wherein the electrical control means for electrically controlling the shutter comprises a second member for electrically controlling the shutter which is configured to bias the shutter towards the bypass position.

4. The assembly for a turbine engine according to claim 1, wherein the fluid control valve comprises a first chamber and a second chamber which are separated from each other by the shutter,
    wherein the fluid control valve comprises a pressurisation inlet for bringing the fluid into the first chamber,
    wherein the spring of the resilient biasing means is a return spring which is configured to bias the displacement of the shutter to the bypass position against the pressure of the fluid in the first chamber.

5. The assembly for a turbine engine according to claim 1, wherein the main branch comprises a check device which is configured to limit or prevent the circulation of fluid to the heat exchanger when the shutter is in the bypass position, wherein the check device comprises a check valve.

6. The assembly for a turbine engine according to claim 1, wherein the bypass branch comprises a hydraulic resistive element which is designed so that a hydraulic resistance value in the bypass branch is substantially equal to a hydraulic resistance value in the main branch, wherein the hydraulic resistive element comprises a diaphragm.

7. The assembly for a turbine engine according to claim 1, wherein the shutter of the fluid control valve is in the main open position when a temperature of the fluid is greater than a second threshold value, when a value of rotation of a turbine engine shaft is greater than a third threshold value, and no fluid leak is detected in the main branch, and/or
    wherein the shutter of the fluid control valve is in the bypass position when the temperature of the fluid is strictly lower than the second threshold value, or when the value of rotation of a turbine engine shaft is strictly lower than the third threshold value, or when a fluid leak is detected in the main branch.

8. The assembly for a turbine engine according to claim 1, wherein the position of the shutter of the fluid control valve is controlled by an electrical control in transient state of the fluid control valve.

9. The assembly for a turbine engine according to claim 1, wherein the fluid control valve comprises a safety position in which the shutter is in the bypass position, wherein the shutter is blocked in the safety position when the shutter is displaced from the main open position to the bypass position by a mechanical hydraulic control of the shutter.

10. The assembly for a turbine engine according to claim 1, comprising a leak detector configured to detect a leak in the main branch when the shutter of the fluid control valve has been displaced from the main open position to the bypass position in the absence of electrical control of displacement of the shutter to the bypass position.

11. The assembly for a turbine engine according to claim 1, comprising a bladed stator sector, the heat exchanger being located in the bladed stator sector
    wherein the bladed stator sector includes blades for straightening a secondary flow of a turbine engine,
    wherein the bladed sector comprises a radially inner platform, a radially outer platform and at least one vane which extends between the radially inner platform and the radially outer platform.

12. A fluid circuit for a turbine engine, comprising two assemblies according to claim 1, the two assemblies including a first assembly and a second assembly arranged fluidly in parallel with the first assembly.

* * * * *